United States Patent
Lehmann

(10) Patent No.: US 11,878,259 B2
(45) Date of Patent: Jan. 23, 2024

(54) PNEUMATIC-HYDRAULIC METHOD FOR BACK-FLUSHING AND DEVICE FOR BACK-FLUSHING FLUID FILTERS USING AN INTEGRATED FLUID-DYNAMIC CLEANING PROCESS

(71) Applicant: Titus Lehmann, Pöhl (DE)

(72) Inventor: Titus Lehmann, Pöhl (DE)

( * ) Notice: Subject to any disclaimer, the term of this patent is extended or adjusted under 35 U.S.C. 154(b) by 0 days.

(21) Appl. No.: 17/757,676

(22) PCT Filed: Nov. 24, 2020

(86) PCT No.: PCT/EP2020/083131
§ 371 (c)(1),
(2) Date: Jun. 17, 2022

(87) PCT Pub. No.: WO2021/121879
PCT Pub. Date: Jun. 24, 2021

(65) Prior Publication Data
US 2023/0016522 A1    Jan. 19, 2023

(30) Foreign Application Priority Data

Dec. 20, 2019    (EP) .................................... 19000584

(51) Int. Cl.
| | | |
|---|---|---|
| *B01D 29/15* | (2006.01) | |
| *B01D 29/66* | (2006.01) | |
| *B01D 29/92* | (2006.01) | |

(52) U.S. Cl.
CPC ............. *B01D 29/15* (2013.01); *B01D 29/66* (2013.01); *B01D 29/92* (2013.01); *B01D 2201/0415* (2013.01); *B01D 2201/303* (2013.01)

(58) Field of Classification Search
CPC .... B01D 29/66; B01D 29/661; B01D 29/668; B01D 2201/0415
(Continued)

(56) References Cited

U.S. PATENT DOCUMENTS 2,365,766 A * 12/1944 Levier .................... B01D 29/92
                                                    210/411
3,387,712 A    6/1968 Schrink

FOREIGN PATENT DOCUMENTS

| DE | 8315430 U1 | 10/1983 |
|---|---|---|
| DE | 29822113 U1 | 2/1999 |

(Continued)

OTHER PUBLICATIONS

International Search Report (and English Translation) for PCT/EP2020/083131, dated Feb. 15, 2021.

*Primary Examiner* — Benjamin M Kurtz
(74) *Attorney, Agent, or Firm* — Heslin Rothenberg Farley & Mesiti P.C.

(57) ABSTRACT

The invention relates to a pneumatic-hydraulic back-flushing method according to claim 1 and a device for back-flushing fluid filters using an integrated hydro-dynamic cleaning process with a filter element (5) arranged in a housing (1) about a support body (9), wherein the housing (1) is designed in such a manner that a fluid inlet (7) and, preferably on the housing lid (2), a fluid outlet (7) are arranged in such a manner that the fluid flow flows through the filter element (5) from the outside to the inside in the filtering process, such that the support body (9) is closed on both sides and a supply pipe (3) is arranged in the interior of the support body (9) in such a manner that said support body projects from the housing lid (2) into the interior of the fluid filter and is open at the bottom, and said supply pipe (3) is arranged in a fluid guide pipe (4), wherein the fluid guide pipe (4) is closed by a base (6) and a compressed air connection (10) is preferably arranged in the housing lid (2) and the fluid flow in the filter process (16) adopts the direction of flow illustrated (16), wherein the fluid is guided through the filter element (5) and the support body (9) into the fluid guide pipe (4), which is open at the top and closed (Continued)

at the bottom, and is guided into the supply pipe (3), which is open at the bottom, in such a manner that said fluid flows to the fluid outlet (8), and for the cleaning process the fluid inlet (7), the fluid outlet (8) and the compressed air inlet (10) are operated by control elements such that the fluid adopts the direction of flow (17).

20 Claims, 2 Drawing Sheets

(58) Field of Classification Search
USPC .......................................... 210/411, 408, 410
See application file for complete search history.

(56) References Cited

FOREIGN PATENT DOCUMENTS

| | | | |
|---|---|---|---|
| DE | 202005018852 U1 | 4/2007 | |
| DE | 102017006709 A1 | 1/2019 | |
| DE | 202019001872 U1 | 5/2019 | |
| EP | 0155336 A1 | 9/1985 | |

\* cited by examiner

PNEUMATIC-HYDRAULIC METHOD FOR BACK-FLUSHING AND DEVICE FOR BACK-FLUSHING FLUID FILTERS USING AN INTEGRATED FLUID-DYNAMIC CLEANING PROCESS

CROSS REFERENCE TO RELATED APPLICATIONS

This application is a national stage filing under section 371 of International Application No. PCT/EP2020/083131, filed on Nov. 24, 2020, and published on Jun. 24, 2021 as WO 2021/121879, which claims priority to European Application No. 19000584.3, filed on Dec. 20, 2019. The entire contents of WO 2021/121879 are hereby incorporated herein by reference.

The invention relates to a method and a device for back-flushing fluid filters for cleaning fluids, in particular for ultra-fine filtering of oils, in which the filter element is flowed through from the outside to the inside in the filtering process and is characterised by the arranged inventive features for the back-flushing process, in that a reservoir with cleaned fluid is formed in such a manner that for the back-flushing process said reservoir is suddenly pressed from the inside outwards through the filter medium with the aid of compressed air and the cleaned layer of dirt is thereby loosened and supplied to a dirt container by the circuit arrangement arranged for this purpose via the otherwise arranged inflow device. This inventive arrangement of the technical elements of the filter achieves the object of significantly increasing the service life before changing the filter cartridge.

A number of filters are known from the prior art which aim at very fine filtering. The filter insert is mainly cleaned externally outside of the filter or by a back-flushing process in such a manner that the direction of flow of the fluid is switched. Thus, DE 298 22 113 U1 discloses a gap-type filter in which the filter fineness can be changed by changing the gap width with the aid of disclosed special material properties. A stripping device is arranged to clean off the impurities that have been deposited, with the aid of which impurities that have been deposited are stripped off the gap-type filter, collected in the lower part of the filter housing and supplied to a collection container via a drain valve. The disadvantage here is that when the dirt layer is stripped off and collected, it mixes with the fluid to be filtered during the filtering process and, due to the formation of turbulence caused by the flow, large parts of the stripped-off protective layer are guided back into the filtering process or that the filter unit must be removed for the cleaning process and must be subjected to an external cleaning process. DE 10 2017 006 709 A1 discloses a filter arrangement consisting of a filter candle with a support sleeve. In this case, the filter element is surrounded by a support sleeve, wherein the support sleeve consists of a stretchable material, is tubular and is pulled over the support sleeve. The disadvantage is that the support sleeve is not used as a filter element and the filter candle is not suitable for a back-flushing process, otherwise the stability of the filter element is no longer guaranteed.

DE 20 2019 001 872 U1 discloses a filter candle in which a back-flushing process is provided, wherein the mesh size is expanded and dirt is removed from the filter material by reversing the direction of the fluid flow. The disadvantage is that during the back-flushing process, the removed dirt partially comes into contact with the fluid that has already been cleaned, as a result of which the fluid that has already been cleaned is partially contaminated or cleaned fluid can reach the soiled space. A further separating device is protected under DE 8315430 U1. Here, the fluid is supplied centrally and guided from the inside to the outside through the arranged filter elements via three radially arranged filter stages and discharged centrally. The dirt particles contained in the fluid are retained in the filter elements on the inner periphery. The disadvantage is that the filter elements have to be removed for the cleaning process in order to clean or replace them individually. Process-integrated cleaning is not possible with this technical design.

U.S. Pat. No. 3,387,712 A describes a tube filter in which a liquid to be filtered flows into a tubular housing via a fluid inlet, passes through the filtering wall of a filter element, which is also tubular and is located inside the tubular housing, and is thereby filtered and as filtered liquid is discharged via a fluid outlet. The filter is cleaned using a backwash liquid. The backwash liquid is introduced into the filter element via the fluid outlet, passes through the wall to the outside and is discharged via the fluid inlet. To improve the effectiveness of the cleaning, a diffuser is arranged inside the filter element, which has a plurality of lugs arranged on a shaft. These lugs lead to an increased movement of the cleaning liquid towards the wall, especially in the upper part of the filter.

EP 0 155 336 A describes a filter in which a filter candle is arranged as a filter element in a suspended solids tank. Inside the filter candle is a tube that extends almost to the base of the filter candle. The resulting gap increases the flow rate of the filtered liquid at the base and largely prevents the deposit of any suspended solids that may still be present. A multi-step process is carried out to remove deposits from the outer surface of the filter. First of all, the suspended solids are emptied as completely as possible via an additional line. After an optional washing of the filter element in the filtering direction of flow, the filter is emptied again and the filter cake is dried in cocurrent, i.e. hot air is fed into the suspended solids space, pressed through the filter element and discharged through the filtrate outlet. Compressed air is then fed in via the filtrate outlet, pressed through the filter element and the filter cake is discharged therewith. The separated cake is removed via a bottom drain.

A plurality of other inventions described relate to a special arrangement and the necessary technical means for fastening and arranging the filter cartridges used in a housing provided for this purpose and for detecting the filter condition, primarily by sensory measurement of the pressure difference between the fluid supplied and the fluid discharged. An associated integration with a cleaning technology is not provided or does not exist with the protected technical features of the invention.

The invention is based on the object of creating a method and a device with which it is possible to design the technical elements of the filter and the fluid flow in such a manner that a back-flushing process for cleaning off the dirt particles deposited on the filter element is effectively made possible, with the technical and energetic effort being minimised for this purpose.

The object is achieved by a fluid filter and a method according to the independent claims. Advantageous embodiments are given in the dependent claims.

According to the invention, the object is achieved in that a bottom-side fluid inlet (7) and a fluid outlet (8), as well as a filter element (5) with a support body (9) arranged on the inside are arranged in a housing (1) of the fluid filter (18), wherein the support body (9) is designed in such a manner that it ensures a fluid passage on the periphery at a low pressure difference, is closed in a fluid-tight manner at the bottom and at the top by a base (19) and at the top by a lid (15), wherein the support body (9) is arranged in the housing (1) in such a manner that it is connected to the housing lid (2) in a fluid-tight manner, and a supply pipe (3) is arranged inside the support body (9) in such a manner that it projects from the housing lid (2) into the interior and is designed to be open at the bottom and that a fluid guide pipe (4) is arranged between the supply pipe (3) and the support body (9) in such a manner that the fluid flow emerging from the supply pipe (3) at the bottom is guided into the interior of the fluid guide pipe (4), wherein the fluid guide pipe (4) is closed by an end (6) and is open at the top, so that the fluid flow is guided via the region of the fluid guide pipe (4) that is open at the top into the inner region of the supply pipe (3) and thus to the fluid outlet (8).

The housing lid (2) is designed in such a manner that a compressed air connection (10) is arranged, wherein the compressed air connection (10) is designed in such a manner that the compressed air present can be activated or deactivated via arranged control elements. Likewise, suitable control elements are preferably provided at the fluid inlet (7) and fluid outlet (8), with which the direction of the fluid flow for the filtering process or the cleaning process are guided accordingly. In order to allow an effective, innovative cleaning of the filter element (5), the fluid flow is to be guided through the arrangement of the elements according to the invention in such a manner that via the arranged control elements, it closes the fluid inlet (7), closes the fluid outlet (8) and connects it to the atmosphere, opens the dirt outlet (12) in order to allow the fluid in the filter to flow out without pressure via the dirt outlet (12) and subsequently or at the same time the compressed air present at the compressed air connection (10) is switched on suddenly and/or in a pulsed manner via the compressed air inlet (11) so that it pushes the impurities deposited on the filter element (5) from the inside outwards out of the filter element (5) and discharges them via the dirt outlet (12).

The fluid thus flows via the supply pipe (3) into the fluid guide pipe (4) into the interior of the support body (9) and thus through the filter element (5) from the inside to the outside, wherein the dirt deposited on the outside of the filter element (5) is removed and guided with the fluid flow through the arranged control elements to the dirt outlet (12). With this inventive idea, the fluid located in the interior of the filter as a fluid reservoir (14) is used as a cleaning reservoir, which is located in the filter up to the upper edge (13) of the fluid reservoir, for the cleaning process. After the fluid from the fluid reservoir (14), including the cleaned dirt, has left the dirt outlet (12), the dirt outlet (12) is blocked by circuitry and the fluid flow is switched in the direction of the filter action as a fluid inlet (7) and the fluid outlet (8) is opened at the same time. A further advantageous embodiment of the idea according to the invention is that the compressed air flow introduced via the housing lid (2) is introduced in a pulsating manner and thus acts in a pulsating manner on the dirt deposited on the filter element (5). Furthermore, it can be advantageous for the compressed air flow connected for cleaning to be activated in such a manner that it is made to act suddenly on the fluid reservoir (14). A further advantageous embodiment of the device according to the invention is that the fluid flows for the cleaning process are controlled in such a manner that at the beginning of this process the fluid in the fluid filter (18) is first drained without pressure, wherein for this purpose, the compressed air inlet (11) and/or fluid outlet (8) are activated/deactivated in such a manner that there is a connection to the atmosphere and at the end of this discharge process the compressed air is made to act on the compressed air inlet (11).

The main field of application of the inventive device and the cleaning method is the ultra-fine filtering of fluids, in particular oils, with an integrated effective cleaning of the impurities deposited on the filter element.

The device and the method according to the invention will be explained in more detail below by means of an embodiment. In the drawings.

Figure 1:
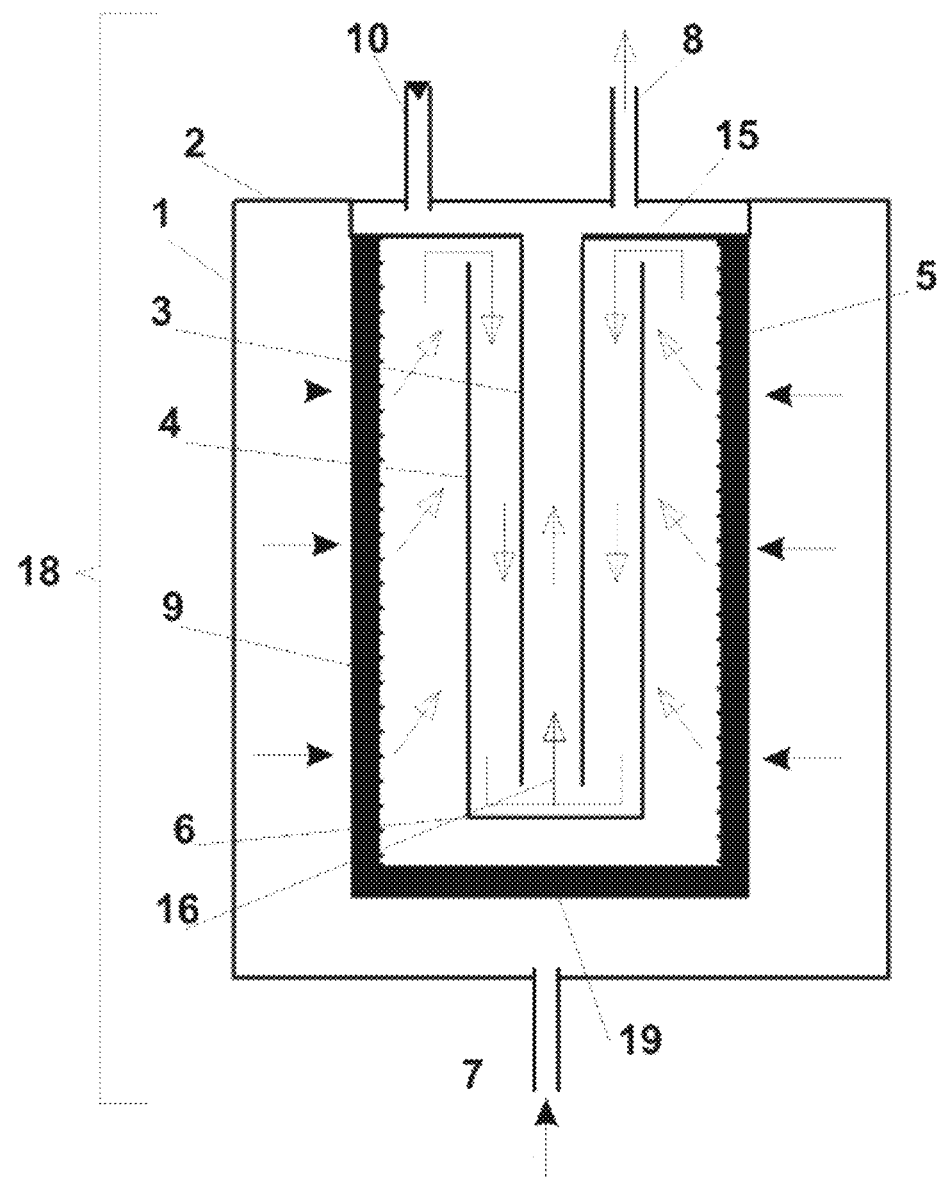
FIG. 1 is a schematic representation of the device in filter action
Figure 2:
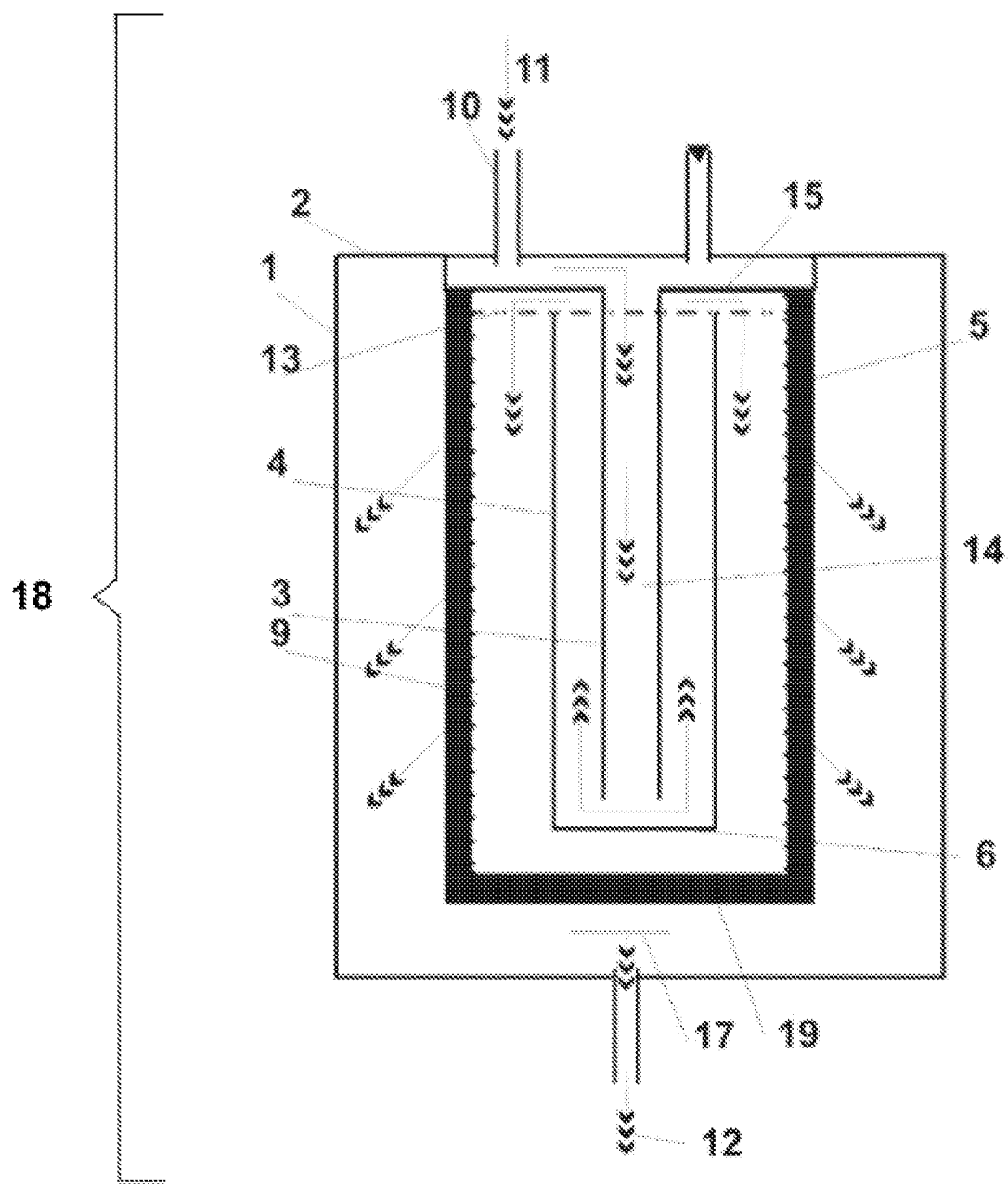
FIG. 2 is a schematic representation of the device in the cleaning process

FIG. 1 shows the device according to the invention for the filtering and cleaning process with its main elements. A bottom-side fluid inlet (7) and a fluid outlet (8), as well as a filter element (5) with a support body (9) arranged on the inside are arranged ina housing (1) of the fluid filter (18), wherein the support body (9) is designed in such a manner that it ensures a fluid passage on the periphery at a low pressure difference, is closed in a fluid-tight manner at the bottom and at the top by a base (19) and at the top by a lid (15), wherein the support body (9) is arranged in the housing (1) in such a manner that it is connected to the housing lid (2) in a fluid-tight manner, and a supply pipe (3) is arranged inside the support body (9) in such a manner that it projects from the housing lid (2) into the interior and is designed to be open at the bottom, and that a fluid guide pipe (4) is arranged between the supply pipe (3) and the support body (9) in such a manner that the fluid flow emerging from the supply pipe (3) at the bottom is guided into the interior of the fluid guide pipe (4), wherein the fluid guide pipe (4) is closed by a base (6) and is open at the top, so that the fluid flow is guided via the region of the fluid guide pipe (4) that is open at the top into the inner region of the supply pipe (3) and thus to the fluid outlet (8). The housing lid (2) is designed in such a manner that a compressed air connection (10) is arranged, wherein the compressed air connection (10) is designed in such a manner that it can be activated or deactivated by means of control technology. Likewise, suitable control elements are preferably provided at the fluid inlet (7) and fluid outlet (8), with which the direction of the fluid flow for the filtering process or the cleaning process are guided accordingly. In the filtering process, the fluid flows in the fluid direction (16) illustrated and to allow this, the fluid inlet (7) is opened and operated in such a manner that this is made possible and at the same time, the fluid outlet (8) is also open. The compressed air inlet (11) is blocked via the arranged compressed air connection (10) via the arranged control device. In FIG. 2, the inventive device is shown in the position for the cleaning process. In order to allow effective, innovative cleaning of the filter element (5) using the inventive method, the fluid flow is to be guided through the arrangement of the elements according to the invention in such a manner that the fluid flow is guided in the direction of flow (17) shown. For this purpose, the fluid outlet (8) is blocked by suitable control elements. For the cleaning process, the compressed air inlet (11) must first be operated in such a manner that there is a connection to the atmosphere. The dirt outlet (12) is then opened and the fluid in the filter flows out via the dirt outlet (12). Subsequently or at the same time, the air flow present at the compressed air connection (10) is connected via the compressed air inlet (11) and this acts on the fluid column in the fluid filter in such a manner that it presses out the fluid present in the filter up to the upper edge (13) of the fluid reservoir. The fluid thus flows via the supply pipe (3) into the fluid guide pipe (4) into the interior of the support body (9) and thus through the filter element (5) from the inside to the outside, wherein the dirt deposited on the outside of the filter element (5) is removed and guided with the fluid flow through the arranged control elements to the dirt outlet (12). With this inventive idea, the fluid located in the interior of the filter as a fluid reservoir (14) is used as a cleaning reservoir, which is located in the filter up to the upper edge (13) of the fluid reservoir, for the cleaning process. After the fluid from the fluid reservoir (14), including the cleaned dirt, has left the dirt outlet (12), the dirt outlet (12) is blocked by circuitry and the fluid flow (17) is switched in the direction of the filter action as a fluid inlet (7), the compressed air inlet (11) is closed and the fluid outlet (8) is opened at the same time. Furthermore, it can be advantageous for the compressed air flow connected for cleaning to be activated in such a manner that it is made to act on the fluid reservoir (14) suddenly or in a pulsating manner. A further advantageous embodiment of the device according to the invention is that the fluid flows for the cleaning process are controlled in such a manner that at the beginning of this process the fluid in the fluid filter (18) is first drained without pressure, wherein for this purpose, the compressed air inlet (11) and/or fluid outlet (8) are activated/deactivated in such a manner that there is a connection to the atmosphere and at the end of this discharge process the compressed air is made to act on the compressed air inlet (11).

LIST OF REFERENCE SIGNS

1 Housing
2 Housing lid
3 Supply pipe
4 Fluid guide pipe
5 Filter element
6 Base
7 Fluid inlet
8 Fluid outlet
9 Support body
10 Compressed air connection
11 Compressed air inlet
12 Dirt outlet
13 Fluid reservoir upper edge
14 Fluid reservoir
15 Lid
16 Direction of flow of the fluid in the filtering process
17 Direction of flow of the fluid for the cleaning process
18 Fluid filter
19 Base

The invention claimed is:
1. A fluid filter (18) comprising:
a filter element (5) arranged around a support body (9) in a housing (1), wherein the support body (9) is closed in a fluid-tight manner at a bottom by a base (19) and at a top by a lid (15),
a fluid inlet (7) and a fluid outlet (8), wherein the fluid inlet (7) and the fluid outlet (8) are arranged in such a manner that the fluid flows through the filter element (5) from an outside to an inside of the filter element,
a supply pipe (3) which is arranged in the interior of the support body (9) and projects from above into the interior of the support body (9) and is open at a bottom of the supply line, and
a compressed air connection (10) having a compressed air inlet (11),
characterised in that the supply pipe (3) is arranged in the support body (9) in a fluid guide pipe (4), wherein the fluid guide pipe (4) is closed by a base (6) and is open at a top of the fluid guide pipe,
and the compressed air inlet (11) is configured to make compressed air act on an upper edge (13) of a fluid reservoir (14) which is present in the interior of the fluid filter (18) during operation of the fluid filter (18).
2. The fluid filter according to claim 1, characterised in that control elements are arranged at the fluid inlet (7), at the fluid outlet (8) and at the compressed air connection (10) and are configured for opening or blocking the fluid inlet (7), the fluid outlet (8) and the compressed air connection (10) and for guiding fluid flow in a direction corresponding to a filtering process or a cleaning process, wherein the control elements comprise a structure that closes and opens the fluid inlet, the fluid outlet, or the compressed air connection.
3. The fluid filter according to claim 1, characterised in that the compressed air connection (10) is arranged on a housing lid (2) and/or on the housing (1).
4. The fluid filter according to claim 1, characterised in that the control elements of the compressed air connection (10) are configured for making a connected compressed air flow act as a pulse on the fluid reservoir upper edge (13).
5. The fluid filter according to claim 1, characterised in that the control elements of the compressed air connection (10) are configured for making a connected compressed air flow act.
6. The fluid filter according to claim 1, characterised in that the compressed air connection (10) and/or the fluid outlet (8) are configured in terms of circuitry for being connected to the atmosphere.
7. A method for cleaning off the impurities deposited on a filter element (5) of a fluid filter (18) according to claim 1, the method comprising the steps of:
blocking the fluid inlet (7) and the fluid outlet (8) and holding the compressed air inlet (11) in a closed state, and
opening the fluid outlet (8) and connecting it to the atmosphere and opening the fluid inlet (7) as a dirt outlet (12), subsequently closing the fluid outlet (8) and activating a compressed air flow being present at the compressed air inlet (11) such that it acts on the upper edge (13) of the fluid reservoir (14) which is present in the interior of the fluid filter (18), or
opening the compressed air inlet (11) and connecting it with atmosphere, and opening the fluid inlet (7) as a dirt outlet (12), subsequently activating a compressed air flow at the compressed air inlet (11), wherein the connected compressed air flow is made to act on the upper edge (13) of the fluid reservoir (14) which is present in the interior of the fluid filter (18), or
activating a compressed air flow at the compressed air inlet (11) and opening the fluid inlet (7) as a dirt outlet (12), wherein the connected compressed air flow is made to act on the upper edge (13) of the fluid reservoir (14) which is present in the interior of the fluid filter (18).
8. The method according to claim 7, characterised in that a compressed air flow connected for the cleaning process is made to act as a pulse on the upper edge (13) of the fluid reservoir (14).
9. The method according to claim 7, characterised in that a compressed air flow connected for the cleaning process is made to act.

10. The fluid filter according to claim 2, characterised in that the compressed air connection (10) is arranged on a housing lid (2) and/or on the housing (1).

11. The fluid filter according to claim 2, characterised in that the control elements of the compressed air connection (10) are configured for making a connected compressed air flow act as a pulse on the fluid reservoir upper edge (13).

12. The fluid filter according to claim 3, characterised in that the control elements of the compressed air connection (10) are configured for making a connected compressed air flow act as a pulse on the fluid reservoir upper edge (13).

13. The fluid filter according to claim 2, characterised in that the control elements of the compressed air connection (10) are configured for making a connected compressed air flow act.

14. The fluid filter according to claim 3, characterised in that the control elements of the compressed air connection (10) are configured for making a connected compressed air flow act.

15. The fluid filter according to claim 4, characterised in that the control elements of the compressed air connection (10) are configured for making a connected compressed air flow act.

16. The fluid filter according to claim 2, characterised in that the compressed air connection (10) and/or the fluid outlet (8) are suitable in terms of circuitry for being connected to the atmosphere.

17. The fluid filter according to claim 3, characterised in that the compressed air connection (10) and/or the fluid outlet (8) are suitable in terms of circuitry for being connected to the atmosphere.

18. The fluid filter according to claim 4, characterised in that the compressed air connection (10) and/or the fluid outlet (8) are suitable in terms of circuitry for being connected to the atmosphere.

19. The fluid filter according to claim 5, characterised in that the compressed air connection (10) and/or the fluid outlet (8) are suitable in terms of circuitry for being connected to the atmosphere.

20. The fluid filter according to claim 1, characterised in that:
control elements are arranged at the fluid inlet (7), at the fluid outlet (8) and at the compressed air connection (10) and are configured for opening or blocking the fluid inlet (7), the fluid outlet (8) and the compressed air connection (10) and for guiding the fluid flow in a direction corresponding to a filtering process or a cleaning process, wherein the control elements comprise a structure that closes and opens the fluid inlet, the fluid outlet, or the compressed air connection;
the compressed air connection (10) is arranged on a housing lid (2) and/or on the housing (1);
the control elements of the compressed air connection (10) are configured for making a connected compressed air flow act as a pulse on the fluid reservoir upper edge (13);
the control elements of the compressed air connection (10) are configured for making a connected compressed air flow act; and
the control elements of the compressed air connection (10) and/or the fluid outlet (8) are suitable in terms of circuitry for being connected to the atmosphere.

* * * * *